United States Patent [19]

Etzbach et al.

[11] Patent Number: 5,393,644
[45] Date of Patent: Feb. 28, 1995

[54] PRODUCTION OF CROSSLINKED POLYMER LAYERS HAVING NONLINEAR OPTICAL PROPERTIES AND THEIR USE

[75] Inventors: Karl-Heinz Etzbach, Frankenthal; Heike Kilburg, Speyer; Hans-Joachim Lorkowski; Karl Pfeiffer, both of Berlin, all of Germany

[73] Assignee: BASF Aktiengesellschaft, Ludwigshafen, Germany

[21] Appl. No.: 167,055

[22] Filed: Dec. 16, 1993

[30] Foreign Application Priority Data

Dec. 24, 1992 [DE] Germany ............................ 4244197

[51] Int. Cl.6 ............................................. G03F 7/027
[52] U.S. Cl. .................................. 430/288; 526/232.1; 526/258; 526/259; 526/266; 526/273; 526/318; 526/318.1; 526/318.2; 526/318.4; 526/319; 526/329; 526/329.7; 430/281; 430/286; 430/321; 522/24
[58] Field of Search .................... 526/232.1, 266, 258, 526/259, 273, 318, 318.1, 318.2, 318.4, 319, 328, 329.7; 430/281, 286, 288, 321; 522/24

[56] References Cited

U.S. PATENT DOCUMENTS

| | | | |
|---|---|---|---|
| 4,855,374 | 8/1989 | Murata et al. | 526/261 |
| 4,975,522 | 12/1990 | Ratzsch et al. | 528/272 |
| 5,116,670 | 5/1992 | Suzuki et al. | 428/285 |
| 5,277,444 | 7/1993 | Muller et al. | 526/311 |
| 5,296,340 | 3/1994 | Tsukada et al. | 430/394 |
| 5,334,486 | 8/1994 | Abe et al. | 430/288 |
| 5,336,743 | 8/1994 | Takaoka et al. | 526/292.4 |

FOREIGN PATENT DOCUMENTS

| | | |
|---|---|---|
| 313474 | 4/1989 | European Pat. Off. . |
| 313475 | 4/1989 | European Pat. Off. . |
| 2246138 | 1/1992 | United Kingdom . |
| 2630744 | 4/1988 | WIPO . |
| 91/03002 | 3/1991 | WIPO . |
| 4028836 | 3/1992 | WIPO . |

OTHER PUBLICATIONS

Crosslinked Epoxy Polymers with Large and Stable . . ., Reck et al, SPIE vol. 1147 Nonlinear Optical Properties of Organic Materials II (1989).

New Photocrosslinkable Polymers for Second-Order . . . Mandal et al. Makromol. Chem., Rapid Commun 12, 607–612 (1991).

*Primary Examiner*—Samuel A. Acquah
*Attorney, Agent, or Firm*—Keil & Weinkauf

[57] ABSTRACT

Crosslinked polymer layers having nonlinear optical properties are produced by a process in which (A) diallyl esters of aromatic dicarboxylic acids or mixtures thereof with monoallyl monoalkyl esters of aromatic dicarboxylic acids are copolymerized with compounds having nonlinear optical activities and containing groups capable of polymerization or (B) prepolymers of diallyl esters of aromatic dicarboxylic acids or prepolymers of mixtures of diallyl esters of aromatic dicarboxylic acids and monoallyl monoalkyl esters of aromatic dicarboxylic acids are mixed with compounds having nonlinear optical activity and with or without polymerizable groups (=guest/host system), applied to a substrate and, after orientation in an electric field above 50° C., crosslinked in a reaction which is initiated thermally or by free radicals.

10 Claims, No Drawings

PRODUCTION OF CROSSLINKED POLYMER LAYERS HAVING NONLINEAR OPTICAL PROPERTIES AND THEIR USE

The present invention relates to a process for the production of crosslinked polymer layers having nonlinear optical properties by copolymerization, doping or intra- or intermolecular reaction with chromophoric compounds having high hyperpolarizability, orientation in an electric field and subsequent crosslinking, and the use of such polymer layers. Such systems are of interest for many applications in opto-electronics, including optical communications technology and the positioning and control of lasers, and in integrated optics.

Materials which exhibit nonlinear optical behavior are characterized by a field strength-dependent dielectric susceptibility and are therefore of considerable interest for applications in opto-electronics and signal processing. A number of inorganic substances, for example potassium dihydrogen phosphate or lithium niobate, exhibit nonlinear optical properties. However, these compounds have various disadvantages, for example their difficult production and processing and hygroscopic properties. Polymers which are provided with dissolved or covalently bonded NLO chromophores having high hyperpolarizability acquire nonlinear optical properties only as a result of the application of an electric field at temperatures in the region of the glass transition, the chromophoric structural units being oriented in a dipolar manner. The materials known at present still have unsatisfactory nonlinear optical properties and do not meet the requirements set. This applies in particular to the so far unsatisfactory long-term stability of the desired nonlinear optical properties.

From the wide range of chromophoric compounds having extensive $\pi$ systems and an asymmetric charge distribution, the most well known members, such as 2-methyl-4-nitroaniline, 4-N,N-dimethylamino-4'-nitrostilbene, 4-N,N-dimethylamino-4'-nitroazobenzene and 4-N,N-ethyl-hydroxyethylamino-4'-nitroazobenzene, have been investigated, as a guest compound in a host polymer or fixed by copolymerization or a polymer-analogous reaction to a polymer main chain (D. J. Williams, Angew. Chemie 96 (1984), 636). The main disadvantage of the guest/host systems is that the guest molecule has only slight compatibility with most of the aliphatic polymers used, and the NLO properties are lost as a result of rapid relaxation of the polarized polymers.

Fixing of the chromophores to the polymer chain results in a slight improvement. Better stabilization is achieved in crosslinked systems.

By polyaddition of bifunctional epoxide monomers with bifunctional aromatic, chromphoric amines, such systems were realized (cf. for example SPIE 1147 Nonlinear optical Properties of organic Materials II (1989) 77). The relatively long reaction time required for crosslinking and the fact that these reactions take place simultaneously with the orientation under polarization conditions are disadvantages (EP 0313 475-A2). This disadvantage is overcome in an expensive synthesis by a polymer-analogous reaction of linear epoxide NLO prepolymers with cinnamoyl or cinnamylideneacetyl chloride. After the forced orientation of the chromophores in an electric field, inter- and intramolecular crosslinking are carried out by photocrosslinking reactions (cf. B. K. Mandel, Makrom. Chem. Rapid. Comm. 12 (1991), 607).

It is an object of the present invention to provide, in a simpler manner, nonlinear optical systems which have excellent stability of the nonlinear optical properties and reach a high second order susceptibility, the above-mentioned disadvantages being taken into account.

It is a particular object of the invention to provide a process for the production of an NLO polymer system, in which no crosslinking of the polymer matrix occurs during the polarization phase in an electric field, with the result that the orientation of the hyperpolarizable structural units in the polymer is not hindered and the oriented state achieved is stabilized by further heating in the electric field with the simultaneous increase in the glass transition temperature.

We have found that this object is achieved, according to the invention, if branched prepolymers based on polyfunctional allyl esters, in particular homo- and copolymers of diallyl phthalate (DAP), diallyl isophthalate (DAIP) and diallyl terephthalate (DATP) are used for this purpose, said prepolymers giving a different crosslinked structure of the polymer matrix, depending on the functionality of the chromophoric compound.

The present invention relates to a process for the production of crosslinked polymer layers having nonlinear optical properties, wherein (A) diallyl esters of aromatic dicarboxylic acids or mixtures thereof with monoallyl monoalkyl esters of aromatic dicarboxylic acids are copolymerized with compounds having nonlinear optical activities and containing groups capable of polymerization or (B) prepolymers of diallyl esters of aromatic dicarboxylic acids or prepolymers of mixtures of diallyl esters of aromatic dicarboxylic acids and monoallyl monoalkyl esters of aromatic dicarboxylic acids are mixed with compounds having nonlinear optical activity (=guest/host system), applied to a substrate and, after orientation in an electric field above 50° C., crosslinked in a reaction which is initiated thermally or by free radicals.

In preferred embodiments of the novel process, diallyl esters of terephthalic acid, isophthalic acid and/or phthalic acid are used as the diallyl esters of aromatic dicarboxylic acids, monoallyl monoalkyl esters having 1 to 5 carbon atoms in the alkyl chain of the monoallyl monoalkyl terephthalate, isophthalate and/or phthalate, in particular allyl methyl terephthalate, isophthalate and/or phthalate, are used as the monoallyl monoalkyl esters of aromatic dicarboxylic acids, and allyl-, acrylate-, methacrylate- or epoxy-containing stilbene, azo or azomethine compounds are used as compounds containing polymerizable groups and having nonlinear optical activity.

Suitable compounds having nonlinear optical activity are those which, according to (A), have very good copolymerization behavior toward aromatic diallyl esters of aromatic dicarboxylic acids or mixtures thereof with monoallyl alkyl esters, or, according to (B), have excellent compatibility with prepolymers of diallyl esters of aromatic dicarboxylic acids or prepolymers of mixtures of diallyl esters of aromatic dicarboxylic acids and monoallyl alkyl esters of aromatic dicarboxylic acids. These are in particular those of the general formula

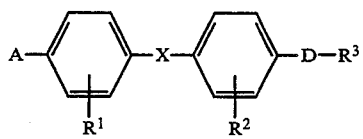

where
R¹, R² and R³ are identical or different and may each be hydrogen, allyl, acrylate, methacrylate or epoxy, X is —N=N—, —CH=CH— or —N=CH—, A is an acceptor group and D is a donor group.

Compounds having nonlinear activity which are particularly suitable for the preparation of the copolymers according to (A) are those of the general formula where R¹, R² and/or R³ are either two hydrogen and one polymerizable group, e.g. methacrylate, acrylate or allyl, or one hydrogen and two polymerizable groups having different tendencies to polymerize, for example methacrylate and allyl, methacrylate and epoxy or acrylate and allyl.

A preferred acceptor group A is nitro.

In the novel process for the free radical crosslinking, a free radical polymerization initiator is preferably used, in an amount of from 0.2 to 5, preferably from 2 to 5%, by weight, based on copolymer (A) or prepolymer (B).

The present invention furthermore relates to the use of crosslinked polymer layers produced by the novel process and having nonlinear optical properties for the production of electro-optical switches or electro-optical modulators.

The novel process can be used to produce highly crosslinked layers and films which have nonlinear optical properties and can be used, for example, in optoelectronics for the production of electro-optical switches for frequency doubling of laser diodes, electro-optical modulators and in optical signal processing.

Regarding the novel process, the following may be stated specifically.

Particularly suitable diallyl esters of aromatic dicarboxylic acids are diallyl phthalate (=DAP), diallyl isophthalate (=DAIP) and diallyl terephthalate (=DATP). Some, i.e. up to 50% by weight, of these diallyl esters may be replaced by monoallyl monoalkyl esters of phthalic acid, isophthalic acid and terephthalic acid, suitable alkyl radicals of the monoallyl monoalkyl esters being those of 1 to 5 carbon atoms, preferably methyl.

Examples of compounds which have nonlinear optical activity and are of the general formula (I) are:

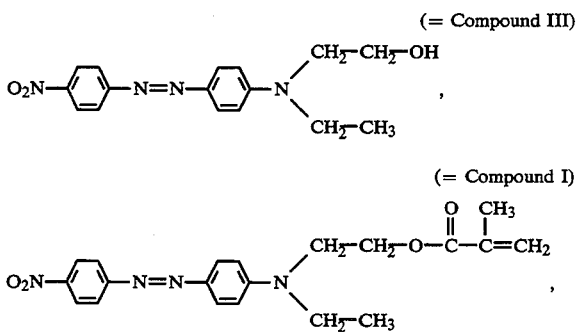

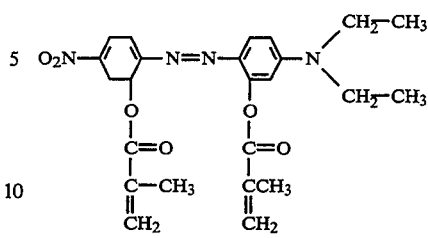

The compounds which have nonlinear optical activity and are of the general formula (I) are, in the polymer layers produced according to the invention, covalently bonded in general in amounts of from 3 to 60, preferably from 5 to 45, mol %, based on the total amount of the copolymer (according to (A), obtained by copolymerization), or (according to (B)) are present in amounts of from 5 to 40, preferably from 10 to 30, mol %, based on the prepolymer.

The allyl ester double bonds have a very good tendency to copolymerize with methcrylate, acrylate and vinyl groups. The copolymerization with chromophores which contain allyl ester groups is particularly advantageous. In principle, other chromophoric compounds having an extensive π electron system can also be used. The only precondition is excellent compatibility with the polymer matrix, which in general is substantially better in the case of the prepolymers used according to the invention as in aliphatic polymer systems.

In the Examples which follow, parts and percentages are by weight, unless stated otherwise.

I. Preparation of Diallyl Benzenedicarboxylate Prepolymers 20 parts of a diallyl benzenedicarboxylate (DAP, DAIP or DATP) are polymerized in the presence of 0.2 parts of benzoyl peroxide under nitrogen at 80° C. in the course of 3 hours to give a branched prepolymer which is still soluble. The prepolymer is separated from monomers still present by dissolution in 160 parts of acetone and subsequent precipitation with 240 parts of methanol. The prepolymer is purified by repeated dissolution and precipitation with acetone/methanol and is finally dried at 60° C.

The copolymers of diallyl terephthalate and allyl methyl terephthalate (84/16% by weight) were obtained in a similar manner.

The properties of the prepolymers or the copolymers are shown in Table 1.

TABLE 1

| Prepolymer | Conversion % | IN[2] | —C=C—/monomer unit[3] | Tg/K Prepolym. | Tg/K[4] |
| --- | --- | --- | --- | --- | --- |
| PDAP | 21 | 55 | 1.4 | 336 | 368 |
| PDAIP | 15 | 81 | 1.2 | 347 | 378 |
| PDATP | 13 | 80 | 1.2 | 379 | 403 |
| PDATP/AMTP[1] | 14 |  | 1.3 | 333 | 376 |

[1] Copolymer of diallyl terephthalate and allyl methyl terephthalate (84/16% by weight)
[2] Iodine number (amount of iodine in g/100 g of polymer)
[3] Conversion of double bonds per monomer unit
[4] Tg = glass transition temperature after thermal treatment (1 h at 453 K).

EXAMPLE 1

(Copolymerization)

10 g of a monomer mixture of 8.4 g (34 mmol) of diallyl terephthalate, 1.6 g (7.2mmol) of diallyl methyl terephthalate and 1.0. g (2.6mmol) of 4'-(2-methacryloxyethyl)-ethylamino-4-nitroazobenzene are treated in the presence of 0.3 g (1.2 mmol) of dibenzoyl peroxide (BPO) for 8 hours at 80° C. under an inert gas atmosphere. After cooling, the prepolymer is precipitated in 160 g of methanol, purified by repeated dissolution in acetone and precipitation in methanol and dried under reduced pressure at 60° C. for 3 hours. The prepolymer is soluble in tetrahydrofuran, cyclohexanone and ethylglycol acetate and contains 7.5% by weight of the azo monomer.

The preparation of a prepolymer with 1.5 g (3.0 mmol) of 2,2'-bis(methacryloxy)-4-diethylamino-4'-nitroazobenzene is carried out under similar conditions. The prepolymer is soluble in acetone, cyclohexanone, tetrahydrofuran and ethylglycol acetate and contains 12.5% by weight of the azo monomer.

EXAMPLE 2

(Guest/Host system)

1 g of prepolymer (PDAP; Mw=14,300, Mn=2,900, Tg=335 K) and 0.1 g of a chromophoric compound (compound I, II or III) are dissolved in 5 ml of cyclohexanone and purified over a 0.5 μm membrane filter. For the polarization in an electric field, 0.8–1.5 μm thick layers are produced by spin coating at 2000 rpm on ITO substrates (=transparent conductive electrode material; indium/tin oxide, 5×5 cm).

To remove solvent residues, the coated substrates are subjected to thermal treatment for 3 hours at 333 K under reduced pressure.

The results obtained are shown in Table 2.

TABLE 2

| Chromophoric compound | Tg after 1 h/333 K | Tg after 1 h/453 K |
|---|---|---|
| Compound III | 329 | 358 |
| Compound I | 325 | 365 |
| Compound II | 339 | 376 |
| Compound I + 2% BPO | 325 | 360[1)] |
| Compound II + 2% BPO | 332 | 366[1)] |
| Compound III + 2% BPO | 334 | 378[1)] |

[1)]Tg after 1 hour at 423° K.

We claim:

1. A process for the production of crosslinked polymer layers having nonlinear optical properties, wherein (A) diallyl esters of aromatic dicarboxylic acids or mixtures thereof with monoallyl monoalkyl esters of aromatic dicarboxylic acids are copolymerized with compounds having nonlinear optical activities and containing polymerizable groups or (B) prepolymers of diallyl esters of aromatic dicarboxylic acids or prepolymers of mixtures of diallyl esters of aromatic dicarboxylic acids and monoallyl monoalkyl esters of aromatic dicarboxylic acids are mixed with compounds having nonlinear optical activity and with or without polymerizable groups (=guest/host system), applied to a substrate and, after orientation in an electric field above 50° C., crosslinked in a reaction which is initiated thermally or by free radicals.

2. A process as claimed in claim 1, wherein diallyl esters of terephthalic, isophthalic or phthalic acid are used as the diallyl esters of aromatic dicarboxylic acids.

3. A process as claimed in claim 1, wherein monoallyl monoalkyl esters where the alkyl chain is of 1 to 5 carbon atoms are used as the monoallyl monoalkyl esters of aromatic dicarboxylic acids.

4. A process as claimed in claim 1, wherein allyl-, acrylate-, methacrylate- or epoxy-containing stilbene, azo or azomethine compounds are used as compounds containing polymerizable groups having nonlinear optical activity.

5. A process as claimed in claim 1, wherein stilbene, azo or azomethine compounds are used as compounds having nonlinear optical activity and with or without polymerizable groups.

6. A process as claimed in claim 1, wherein allyl methyl terephthalate, isophthalate or phthalate is used as the monoallyl monoalkyl ester of aromatic dicarboxylic acids.

7. A process as claimed in claim 1, wherein a compound of the formula (I)

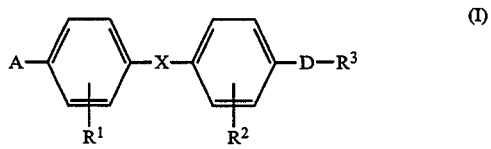

where $R^1$, $R^2$ and $R^3$ are identical or different and may each be hydrogen, allyl, acrylate, methacrylate or epoxy, X is —N=N—, —CH=CH— or —N=CH—, A is an acceptor group and D is a donor group, is used as the compound having nonlinear optical activity.

8. A process as claimed in claim 1, wherein the acceptor group A is nitro.

9. A process as claimed in claim 1, wherein a free radical polymerization initiator, in an amount of from 0.2 to 5% by weight, based on copolymer (A) or prepolymer (B), is used for the free radical crosslinking.

10. A process for the production of electro-optical switches or electro-optical modulators using crosslinked polymer layers having nonlinear optical properties, which comprises using crosslinked polymer layers as obtained by the process of claim 1.

* * * * *